United States Patent
Anderson et al.

(10) Patent No.: US 11,024,961 B2
(45) Date of Patent: Jun. 1, 2021

(54) ELECTRONICALLY STEERABLE ANTENNA ARRAY

(71) Applicant: Cisco Technology, Inc., San Jose, CA (US)

(72) Inventors: Fred J. Anderson, Lakeville, OH (US); Danielle N. Bane, Cleveland, OH (US); John M. Blosco, Norton, OH (US); Paul J. Stager, Akron, OH (US); Daniel N. Johnson, Louisville, OH (US); Timothy A. Frank, Medina, OH (US); John M. Swartz, Lithia, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/875,655

(22) Filed: May 15, 2020

(65) Prior Publication Data

US 2021/0135359 A1 May 6, 2021

Related U.S. Application Data

(60) Provisional application No. 62/931,583, filed on Nov. 6, 2019.

(51) Int. Cl.
*H04B 7/0413* (2017.01)
*H01Q 3/36* (2006.01)
*H04B 7/06* (2006.01)

(52) U.S. Cl.
CPC ............. *H01Q 3/36* (2013.01); *H04B 7/0413* (2013.01); *H04B 7/0617* (2013.01)

(58) Field of Classification Search
CPC .......................... H04B 7/0617; H04B 7/0602
See application file for complete search history.

(56) References Cited

U.S. PATENT DOCUMENTS

| | | |
|---|---|---|
| 6,504,517 B1 | 1/2003 | Liu et al. |
| 6,738,019 B1 | 5/2004 | Luz et al. |
| 9,479,241 B2 | 10/2016 | Pabla |
| 10,129,887 B2 | 11/2018 | Pabla |
| 2003/0164791 A1 | 9/2003 | Shinoda et al. |

(Continued)

OTHER PUBLICATIONS

PCT Notification of Transmittal of the International Search Report and the Written Opinion of the International Searching Authority, or the Declaration for Application No. PCT/US2020/057947 dated Jan. 21, 2021.

*Primary Examiner* — Kevin Kim
(74) *Attorney, Agent, or Firm* — Patterson + Sheridan, LLP

(57) ABSTRACT

An electronically a steerable and switchable antenna array is provided that can produce a first beam with a first coverage range and a second beam with a second coverage range by selecting one of a first and a second beamwidth for both the first and second beams; in response to selecting the first beamwidth: switching signal inputs to narrow-beam antenna arrays; steering the first beam to one of a first positive, negative, or zero offset position; independently steering the second beam to one of a second positive, negative offset, or zero offset position; and transmitting signals received from the signal inputs via the first beam and the second beam; and in response to selecting the second beamwidth: switching signal inputs to wide-beam antenna arrays; and transmitting signals received from the signal inputs via the first beam and the second beam.

20 Claims, 12 Drawing Sheets

(56) References Cited

U.S. PATENT DOCUMENTS

| | | |
|---|---|---|
| 2004/0157645 A1 | 8/2004 | Smith et al. |
| 2014/0210666 A1 | 7/2014 | Maltsev et al. |
| 2019/0222279 A1* | 7/2019 | Xi .................... H04W 72/00 |

* cited by examiner ered to produce a first beam with a first coverage range and
ELECTRONICALLY STEERABLE ANTENNA ARRAY

CROSS-REFERENCE TO RELATED APPLICATIONS

The present disclosure claims priority to and the benefit of U.S. Provisional Patent Application Ser. No. 62/931,583 filed on Nov. 6, 2019, which is hereby incorporated herein by reference in its entirety.

TECHNICAL FIELD

Embodiments presented in this disclosure generally relate to antennas. More specifically, embodiments disclosed herein related to arrays of antennas that provide various controllable coverage patterns with low interference to neighboring devices.

BACKGROUND

As wireless communications options are offered in more locations, and more users take advantage of the offered wireless communications services, the demand for bandwidth and the potential for interference increases. In large venues, such as stadiums, theaters, gymnasiums, parks, etc., large expanses of open spaces can exist between the Access Points (APs) offering the wireless communication services and the stations (STA) relying on the APs for network connection. Unencumbered propagation of signals across the open spaces can lead to low cross-attenuation between cells, and exacerbates interference in the network, as network operations are limited in how different channels can be reused; placing a greater premium on free spectrum.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
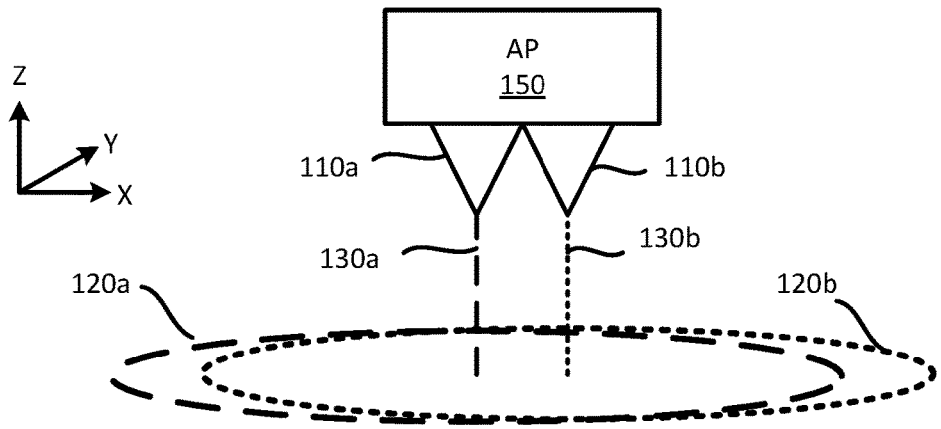
FIGS. 1A and 1B illustrate coverage ranges for an antenna array using wide beam arrays included therein, according to embodiments of the present disclosure.

One embodiment presented in this disclosure is a device, including: a plurality of antenna segments that each include: a narrow-beam antenna array, configured to produce a first beam of a first beamwidth; a wide-beam antenna array, configured to produce a second beam of a second beamwidth greater than the first beamwidth of the first beam; a switching pathway, configured to selectively activate one of the narrow-beam antenna array or the wide-beam antenna array at a given time; a first phase shifter and a second phase shifter connected between the switching pathway and the narrow-beam antenna array, configured to steer the first beam in an azimuthal plane from a first position to a second position; wherein when a given first beam of a given antenna segment of the plurality of antenna segments is steered to the first position and a different first beam of a different antenna segment of the plurality of antenna segments is steered to the first position, respective coverage ranges of the given first beam and the different first beam overlap; and wherein when the given first beam is steered to the second position and the different first beam is steered to the second position, the respective coverage ranges of the given first beam and the different first beam are spatially isolated from one another.

One embodiment presented in this disclosure is a system, including: a steerable and switchable antenna array configa second beam with a second coverage range; a processor; and a memory storing instructions that, when executed by the processor, enable the steerable and switchable antenna array to: select one of a first beamwidth and a second beamwidth for both the first beam and the second beam; in response to selecting the first beamwidth: switch signal inputs to narrow-beam antenna arrays included in the steerable and switchable antenna array; steer the first beam to one of a first positive offset, a first negative offset, and a first neutral position; steer the second beam to one of a second positive offset, a second negative offset, and a second neutral position; and transmit signals received from the signal inputs via the first beam and the second beam; and in response to selecting the second beamwidth: switch signal inputs to wide-beam antenna arrays included in the steerable and switchable antenna array; and transmit signals received from the signal inputs via the first beam and the second beam.

One embodiment presented in this disclosure is a method including: forming, by a first antenna segment, a first beam with a first coverage range, wherein forming the first beam includes: tapering a first amplitude of the first beam by supplying lower power to external elements of a first antenna array than to internal elements of the first antenna array; and steering the first beam from a first neutral position to one of a first positive offset and a first negative offset by phase shifting signals for transmission according to the first beam across columns of the first antenna array; forming, by a second antenna segment, a second beam with a second coverage range, wherein forming the second beam includes: tapering a second amplitude of the second beam by supplying lower power to external elements of a second antenna array than to internal elements of the second antenna array; and steering the second beam from a second neutral position to one of a second positive offset and a second negative offset by phase shifting signals for transmission according to the second beam across columns of the second antenna array; wherein the first coverage range and the second coverage range form a boresight pattern when the first beam is steered to the first positive offset and the second beam is steered to the second negative offset; and wherein the first coverage range and the second coverage range form an expanded linear pattern with spatial isolation between the first coverage range and the second coverage range when the first beam is steered to the first negative offset and the second beam is steered to the second positive offset.

Example Embodiments

The present disclosure provides an electronically beamwidth switchable, beam steerable antenna array with ultra-low side lobes. The antenna can be packaged in a single weatherproofed enclosure together with AP control hardware for deployment in a variety of venues including spaces that are enclosed, semi-enclosed, or open air. The arrays are capable of switching from various beam widths and in one beam width setting are electronically steerable (i.e., the antenna remains stationary, but the direction in which the main beam is projected changes). In one embodiment, the antenna array includes two separately switchable and steerable antenna sets, which each allow for switching between a fixed wide beam and associated coverage ranges/areas and a steerable narrow beam. Each antenna set is configured to operate in a Multiple Input Multiple Output arrangement according to various communications standards. In various embodiments, a Butler matrix steers the main beam to form various coverage patterns based on the physical layout of the antennas and wireless communications needs in the venue.

Figure 1B:
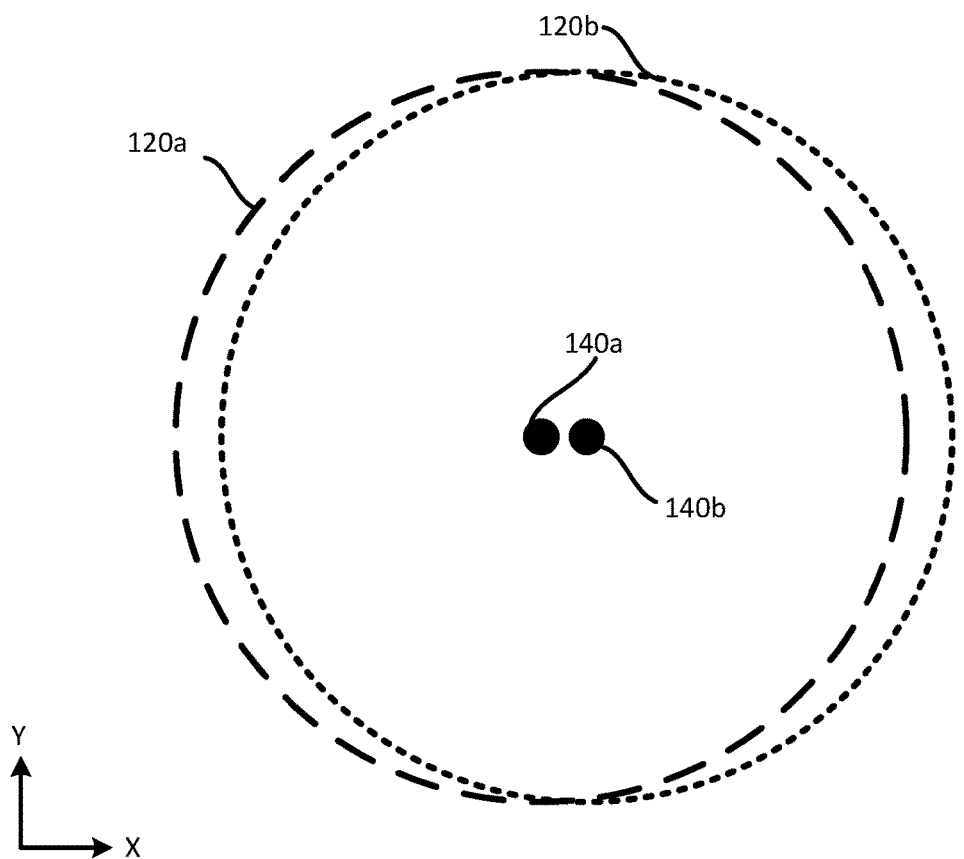

FIGS. 1A and 1B illustrate coverage ranges 120a, 120b for an antenna array using wide beam arrays 110a, 110b included therein, according to embodiments of the present disclosure. FIG. 1A provides an isometric view of the coverage ranges 120a, 120b in relation to the AP 150 and the wide beam arrays 110a, 110b, while FIG. 1B provides an overhead view of the coverage ranges 120a, 120b (e.g., in the YX plane). When switched to use the wide beam arrays 110a, 110b, an AP 150 can send and receive signals with various devices located within the respective coverage ranges 120a, 120b for those wide beam arrays 110a, 110b. The wide beam arrays 110a, 110b generate respective fixed beams 130a, 130b (i.e., beams that are not electronically steerable) to generate the corresponding coverage ranges 120a, 120b centered at a given point 140a, 140b in the environment. As illustrated, the fixed beams 130a, 130b are shown at the center of the corresponding coverage ranges 120a, 120b emanating from the respective wide beam arrays 110a, 110b.

Figure 2A:
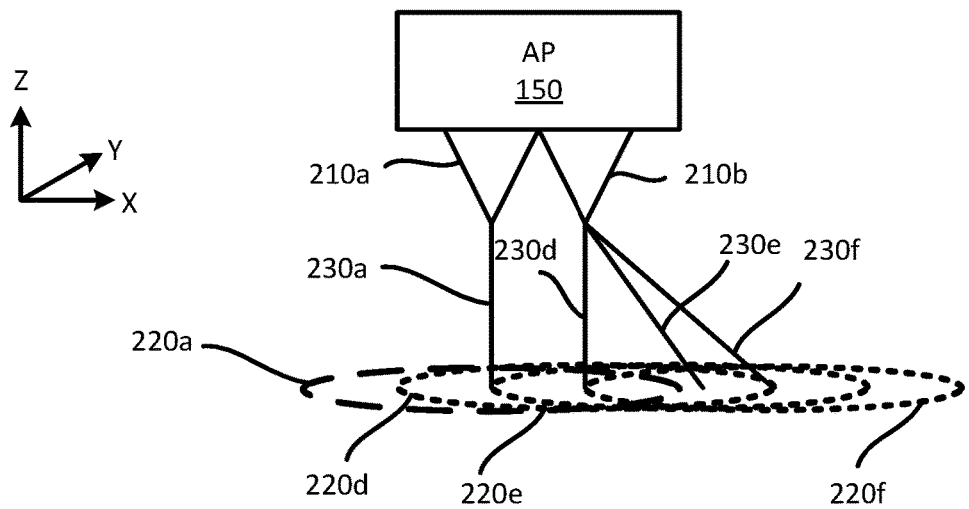
FIGS. 2A-2F illustrate coverage ranges for an antenna array using the steerable narrow beam arrays included therein, according to embodiments of the present disclosure.
Figure 2B:
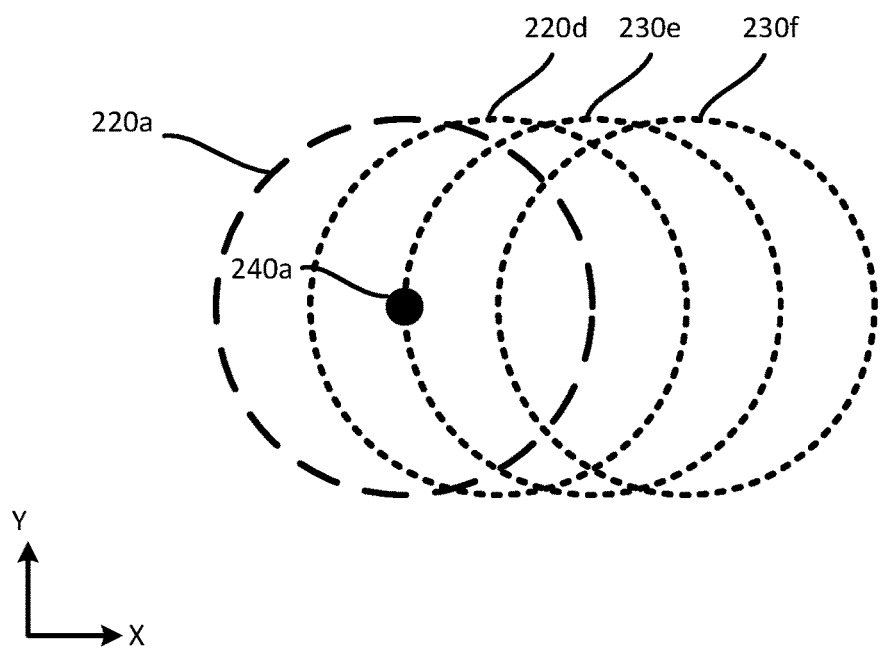
Figure 2C:
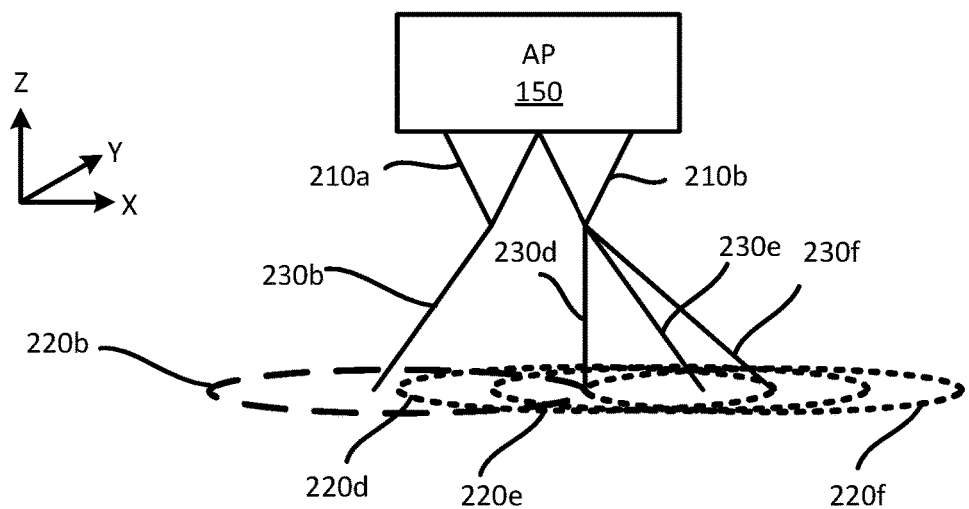
Figure 2D:
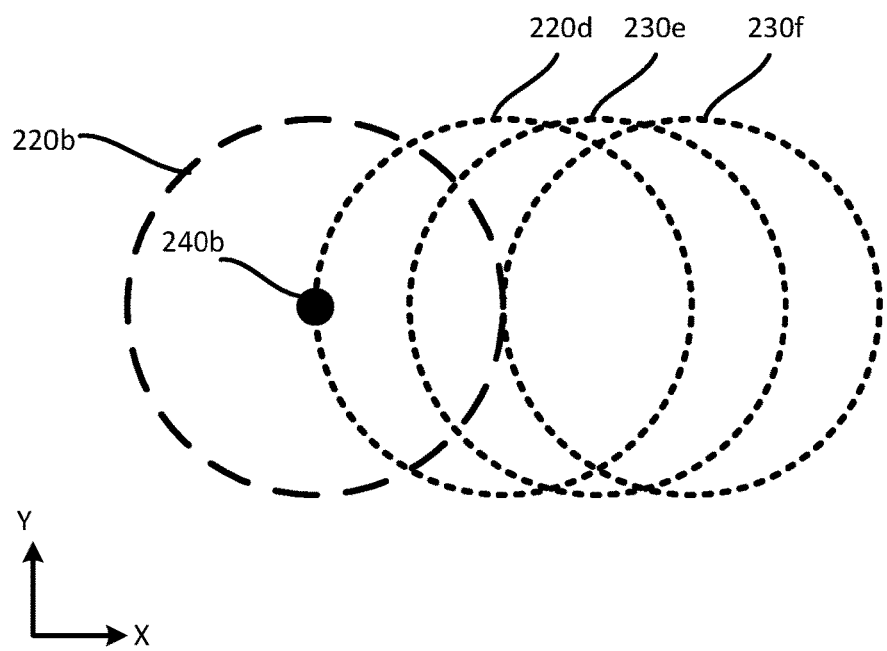
Figure 2E:
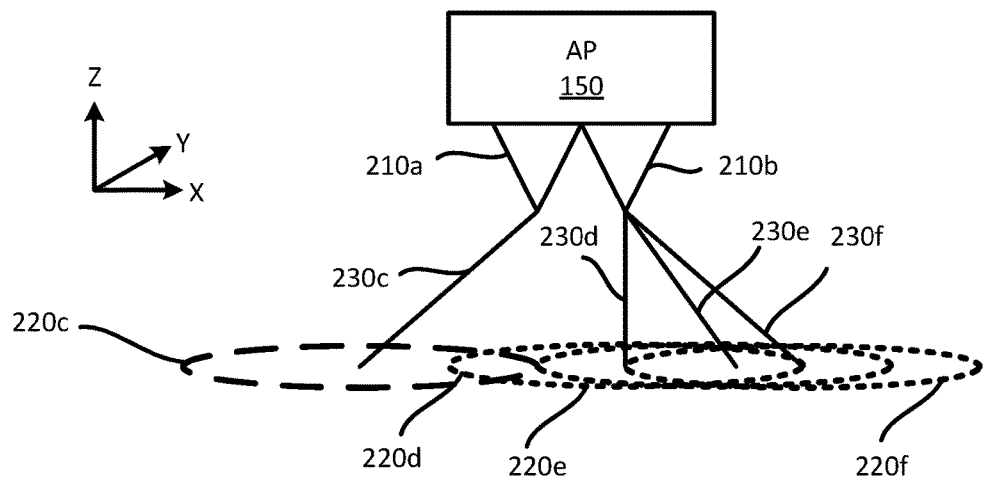
Figure 2F:
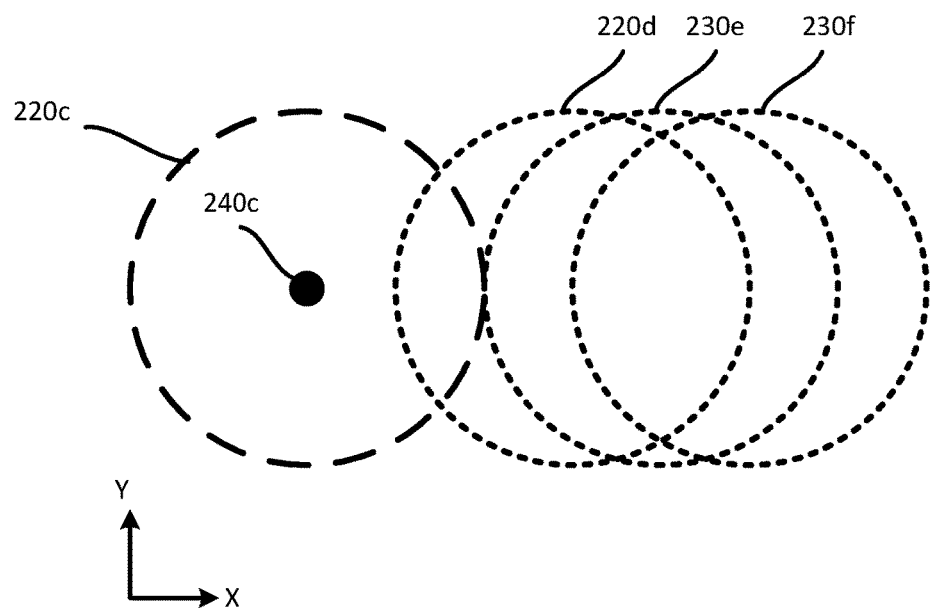

FIGS. 2A-2F illustrate coverage ranges 220a-f for an antenna array using the steerable narrow beam arrays 210a, 210b included therein, according to embodiments of the present disclosure. FIGS. 2A, 2C, and 2E provide isometric views of the coverage ranges 220a-f in relation to the AP 150 and the narrow beam arrays 210a, 210b, while FIGS. 2B, 2D, and 2F provide overhead views of the coverage ranges 220a-f (e.g., in the YX plane). When switched to use the narrow beam arrays 210a, 210b, an AP 150 can send and receive signals with various devices located within the respective coverage ranges 220a-f for those narrow beam arrays 210a, 210b. The narrow beam arrays 210a, 210b generate respective steerable beams 230a-f (i.e., beams that are electronically steerable to different angles of transmission relative to the narrow beam arrays 210a, 210b) to generate the corresponding coverage ranges 220a-f, 220b centered at a given point 240a-c in the environment. As illustrated, the steerable beams 230a-f are shown at the center of the corresponding coverage ranges 220a-f, emanating from the respective narrow beam arrays 210a, 210b.

Each of FIGS. 2A-2F illustrate three potential steering arrangements for the second narrow beam array 210b in relation to one potential steering arrangement for the first narrow beam array 210a in a given figure. Each of the narrow beam arrays 210a, 210b are independently and separately steerable from one another, and thus in embodiments with X potential steering arrangements, there are $X^2$ potential overall arrangements. For example, a first and second narrow beam array 210a, 210b each with three potential steering states provide a total of nine different potential steering arrangements.

FIGS. 2A and 2B illustrate the first narrow beam array 210a producing a narrow beam 230a having a first narrow coverage range 220a in a first position and the fourth, fifth, and sixth narrow beams 230d-f that the second narrow beam array 210b can produce with the respective fourth, fifth, and sixth narrow coverage ranges 220d-f. The first narrow coverage range 220a and the fourth narrow coverage range 220d form a boresight coverage pattern, with significant overlap between the coverage ranges of the different beam arrays 210a, 210b (e.g., a greatest amount of overlap of the potential patterns). As the second narrow beam array 210b steers the narrow beams from the fourth position 230d to the fifth position 230e and from the fifth position 230e to the sixth position 230f (i.e., further away from the first narrow coverage range 220a than the fourth coverage range 220d), the overlap between the coverage ranges decreases. Although the first coverage range 220a is illustrated as having at least some overlap with the fifth and sixth coverage range 220e-f in FIGS. 2A and 2B, in various embodiments, spatial isolation can exist between the first coverage range 220a and one or more of the fifth and sixth coverage ranges 220e-f, where no overlap exists between the respective coverage ranges.

FIGS. 2C and 2D illustrate the first narrow beam array 210a producing a narrow beam 230b having a second narrow coverage range 220b in a second position and the fourth, fifth, and sixth narrow beams 230d-f that the second narrow beam array 210b can produce with the respective fourth, fifth, and sixth narrow coverage ranges 220d-f. The second narrow coverage range 220b provides less overlap and/or more spatial isolation to the fourth, fifth, and sixth coverage ranges 220d-f than the first narrow coverage range 220a does respectively.

FIGS. 2E and 2F illustrate the first narrow beam array 210a producing a narrow beam 230c having a third narrow coverage range 220c in a third position and the fourth, fifth, and sixth narrow beams 230d-f that the second narrow beam array 210b can produce with the respective fourth, fifth, and sixth narrow coverage ranges 220d-f. The third narrow coverage range 220c and the sixth narrow coverage range 220f form an expanded linear coverage pattern, with significant spatial isolation between the coverage ranges of the different beam arrays 210a, 210b (e.g., a greatest amount of spatial isolation of the potential patterns). The third narrow coverage range 220c provides less overlap and/or more spatial isolation to the fourth, fifth, and sixth coverage ranges 220d-f than the second narrow coverage range 220b does respectively.

Figure 3A:
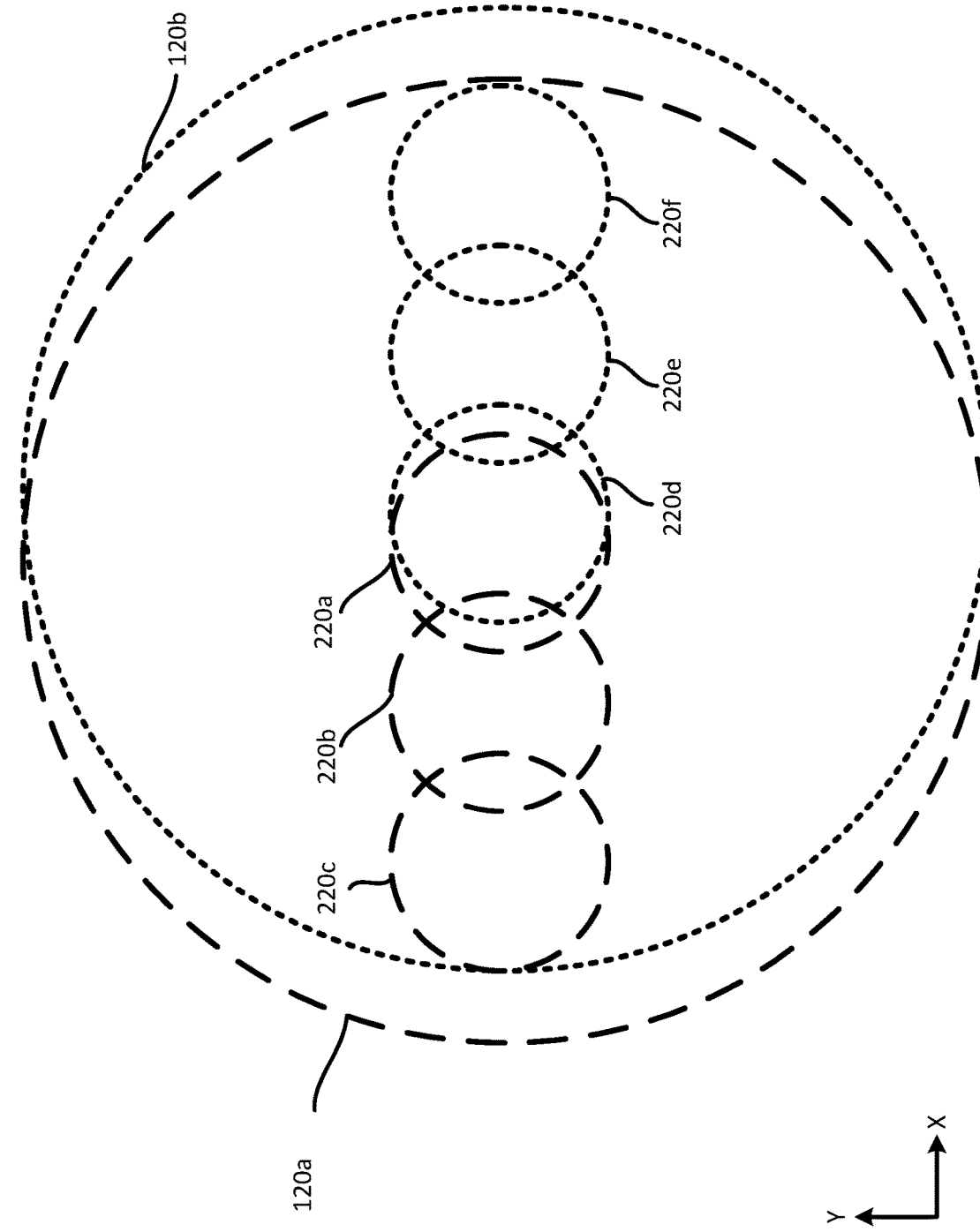
FIGS. 3A and 3B illustrate overlays of a first wide coverage range for a first wide beam array and the coverage ranges of a first narrow beam array, according to embodiments of the present disclosure.
Figure 3B:
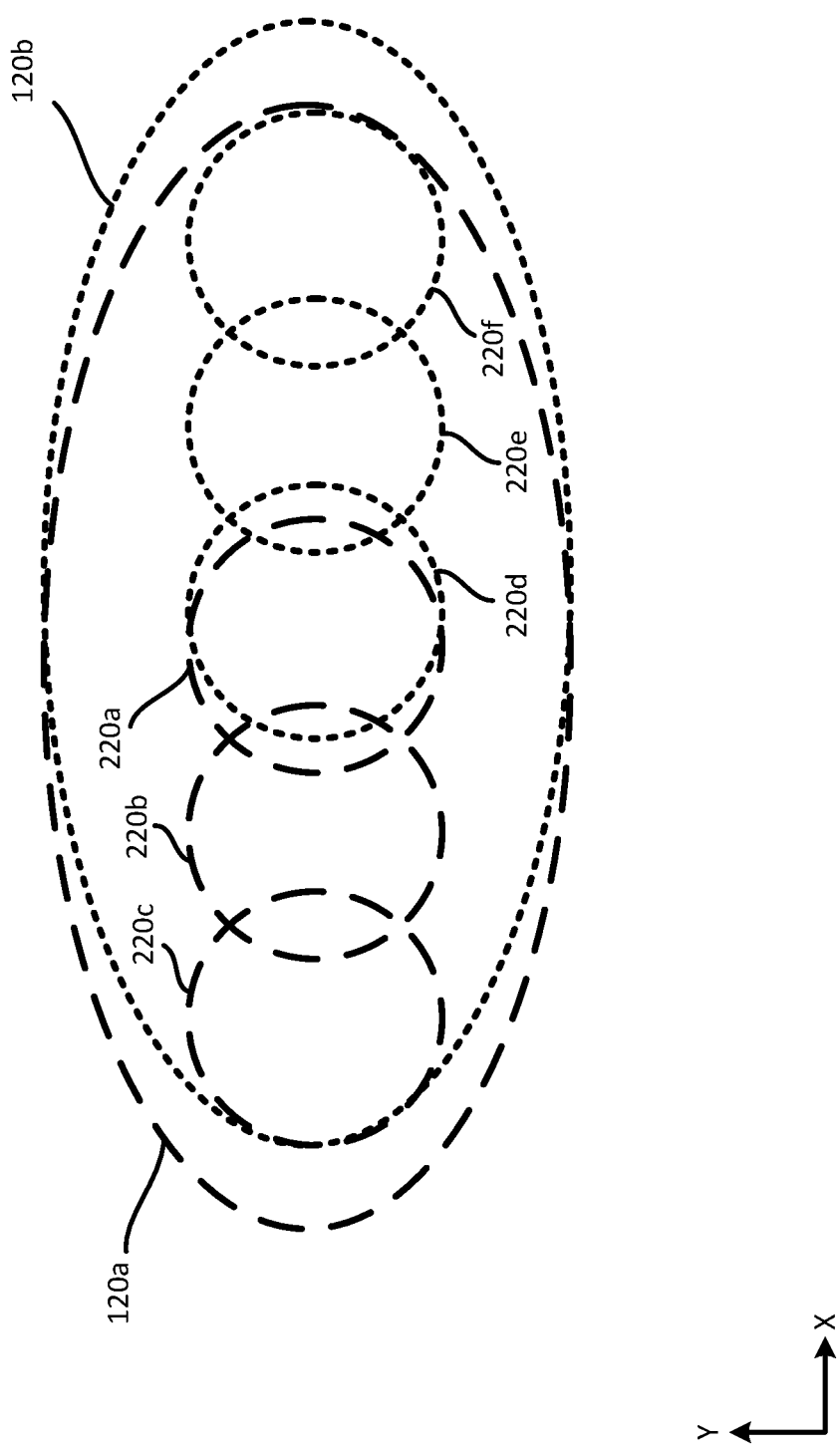

FIGS. 3A and 3B illustrate overlays of the wide coverage range 120a, 120b for a wide beam arrays 110a, 110b (not illustrated) and the narrow coverage ranges 220a-f of a narrow beam array 210a, 210b (not illustrated), according to embodiments of the present disclosure.

The first wide coverage range 120a and the second wide coverage range 120b are illustrated as encompassing all of the narrow coverage ranges 220a-f. In some embodiments, the first wide coverage range 120a can encompass the associated narrow coverage ranges 220a-c produced in a shared antenna segment and some, but not all of the narrow coverage ranges 220d-f produced in a different antenna segment. Similarly, in some embodiments, the second wide coverage range 120b can encompass the associated narrow coverage ranges 220d-f produced in a shared antenna segment and some, but not all of the narrow coverage ranges 220a-c produced in a different antenna segment. Accordingly, an AP may switch to the wide coverage ranges 120a, 120b to serve a larger area in the environment and switch to the narrow coverage ranges 220a-f to serve smaller (and thus more selective) areas in the environment, for example due to a high user density in the environment all competing for limited bandwidth or user capacity in a given AP 150.

Although illustrated as generally circular in cross section in FIG. 3A, it will be appreciated that the coverage ranges 120a, 120b and 220a-f may have other shapes based on the number of elements in each array. For example, in FIG. 3B, the coverage ranges 120a, 120b are shown with asymmetric (e.g., non-circular ovoid shapes), which allows for less difference in the areas served by wide and narrow beam arrays. As will also be appreciated, various embodiments can cover ranges that are more spatially isolated, less spatially isolated, have greater overlap, have less overlap, etc. between individual coverage ranges, and FIGS. 3A and 3B provide non-limiting examples of coverage range overlays.

Figure 4A:
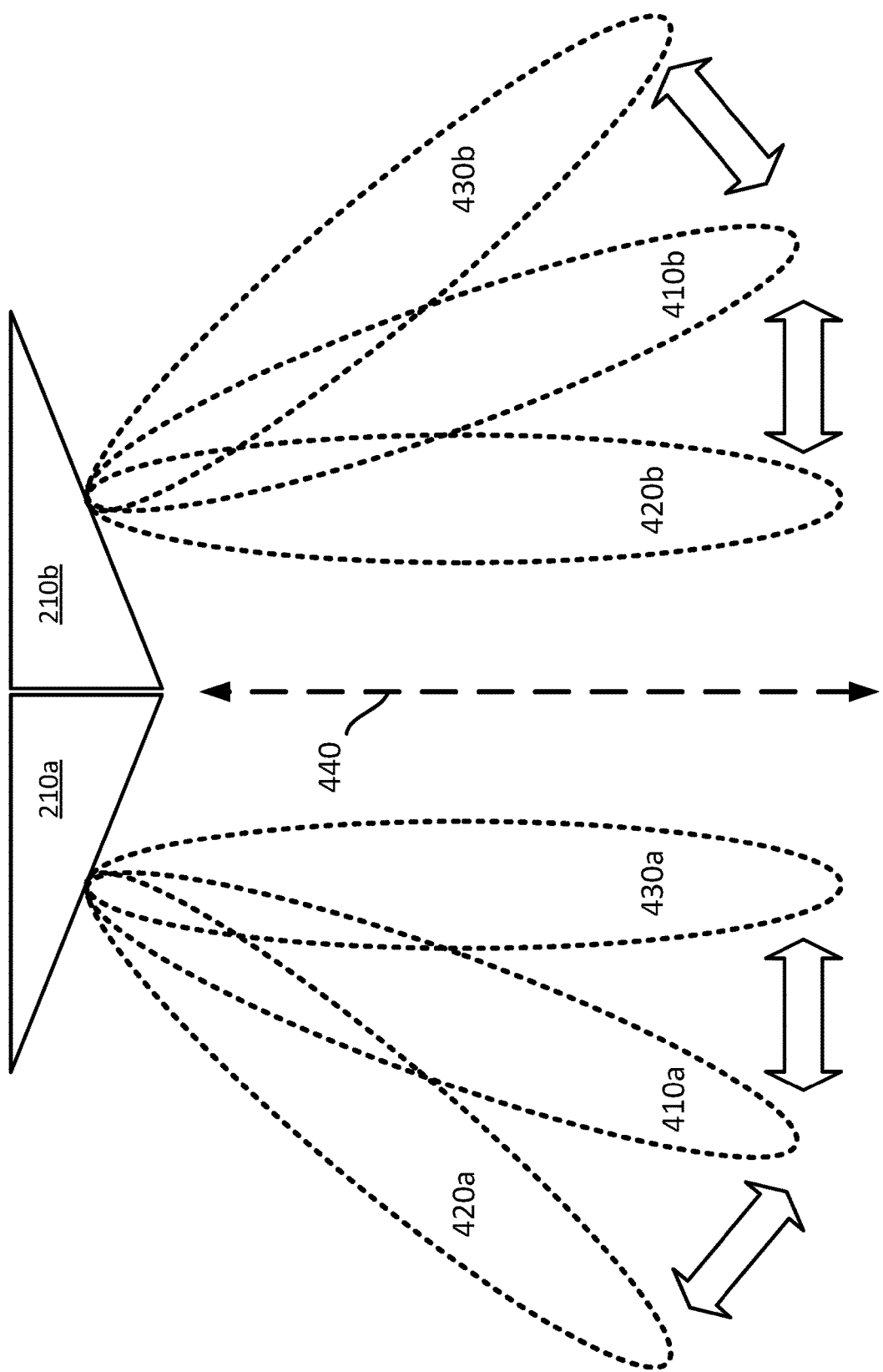
FIGS. 4A and 4B illustrate steering positions and offsets for the narrow beam arrays, according to embodiments of the present disclosure.
Figure 4B:
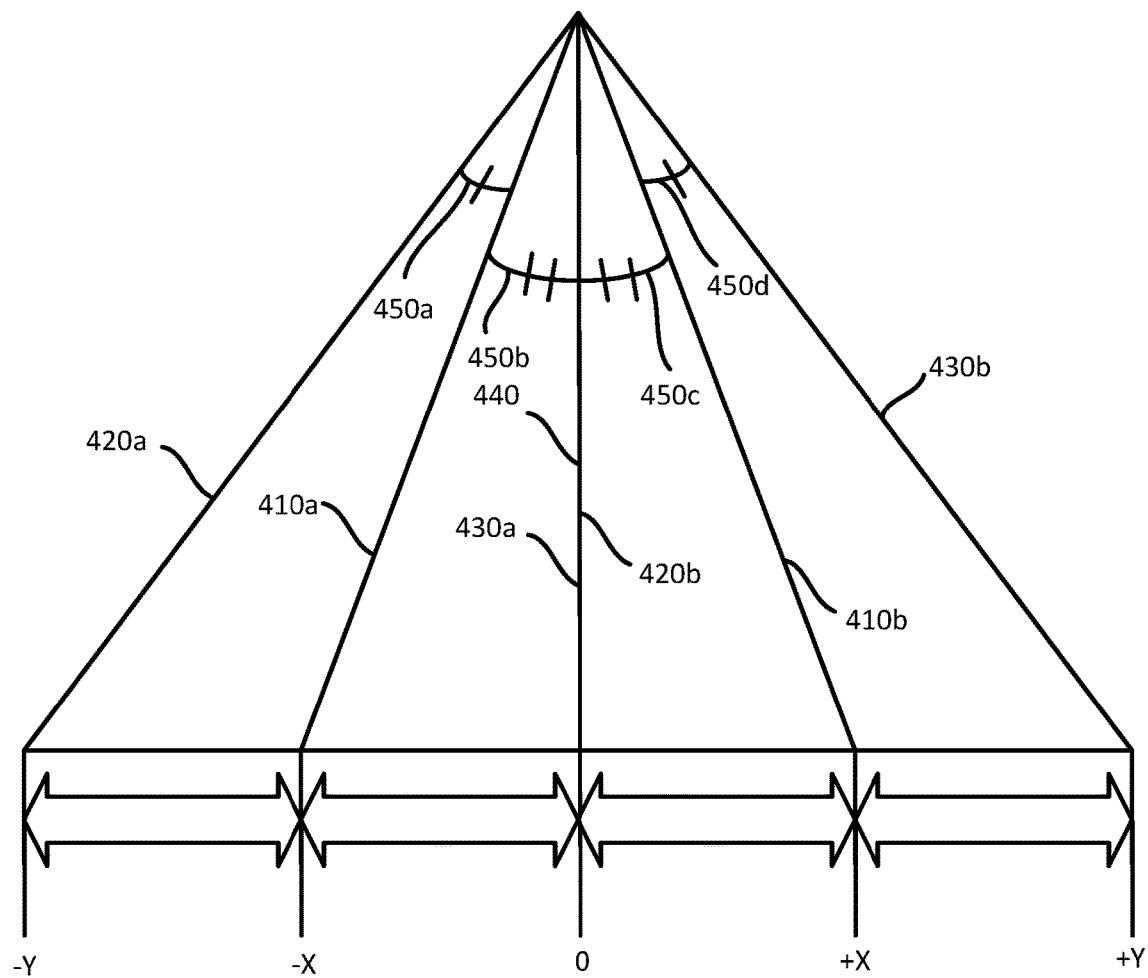

FIGS. 4A and 4B illustrate steering positions and offsets for the narrow beam arrays 210, according to embodiments of the present disclosure. FIG. 4A shows a first set of steering positions 410a, 420a, and 430a for a first narrow beam array 210a and a second set of steering positions 410b, 420b, and 430b for a second narrow beam array 210b in relation to reference line 440. The reference line 440 is perpendicular to the mounting direction of the antenna array including the narrow beam arrays 210. For example, when the antenna array is mounted horizontally (e.g., to a ceiling, an underside of catwalk, a horizontal support or strut), the reference line 440 is aligned vertically; however, when the antenna array is mounted vertically (e.g., to a wall, a side of a catwalk, a vertical support or strut), the reference line is aligned horizontally. Accordingly, the set of steering positions are in the azimuthal plane, relative to the reference line 440.

The first narrow beam array 210a can steer a narrow beam to a first neutral position 410a (also referred to as a first zero-offset position) that corresponds to the second narrow coverage range 220b (per FIGS. 2C and 2D), a first negative offset 420a that corresponds to the third narrow coverage range 220c (per FIGS. 2E and 2F), and a first positive offset 430a that corresponds to the first narrow coverage range 220a (per FIGS. 2A and 2B). Similarly, the second narrow beam array 210b can steer a narrow beam to a second neutral position 410b (also referred to as a second zero-offset position) that corresponds to the fifth narrow coverage range 220e (per FIGS. 2A-2F), a second negative offset 420b that corresponds to the fourth narrow coverage range 220d (per FIGS. 2A-2F), and a second positive offset 430b that corresponds to the sixth narrow coverage range 220f (per FIGS. 2A-2F).

Each of the offsets (positive and negative) adjust the angle of the respective narrow beam by an even amount from the respective neutral position, and the first positive offset 430a and the second negative offset 420b align the respective narrow beams to be parallel to the reference line 440. The first narrow beam array 210a and the second narrow beam array 210b disposed in tilted planes relative to the reference line 440, with the included angle of tilt set based on the angle by which the respective narrow beams are steerable. For example, when the angle of steering between the first neutral position 410a and the first positive offset 430a is R degrees, the first narrow beam array 210a is counter-tilted by R degrees so that the first neutral position 410a is −R degrees from parallel with the reference line 440 and the first positive offset 430a is parallel to the reference line 440. Continuing the example, the difference from the first neutral position 410a to the first negative offset 420a is −T degrees, where T may equal R or be unequal to R in various embodiments.

FIG. 4B illustrates adjustments from a reference line 440 marked at position 0, the first neutral position 410a marked at position −X, and the second neutral position 410b marked at position +X. Each of the narrow beam arrays 210 can steer a respective beam by a positive increment or a negative increment from the neutral position 410a/410b to align the beam in parallel to the reference line 440 (e.g., at position 0) or at a position ±Y from the reference line 440. The angles of steering 450a-d between the different positions are shown such that the first angle of steering 450a is equal to the fourth angle of steering 450d (e.g., the first neutral position 410a and the first negative offset 420a and the second neutral position 410b and the second positive offset 430b) and the second angle of steering 450b is equal to the third angle of steering 450c (e.g., the first neutral position 410a and the first positive offset 430a and the second neutral position 410b and the second negative offset 420b). In some embodiments, all of the angles of steering 450a-d are equal to one another, while in others, the two sets of steering angles 450a/450d and 450b/450c are distinct from one another. As will be appreciated, depending on the topography or presence of walls or other obstructions in the environment (and whether the antenna array is mounted vertically, horizontally, or some intermediate angle) steering the beams by equal angles in opposite direction may not result in an even translation of the coverage area. Additionally, portions of the coverage area positioned at different distances from the antenna array may experience different signal strengths.

Figure 5:
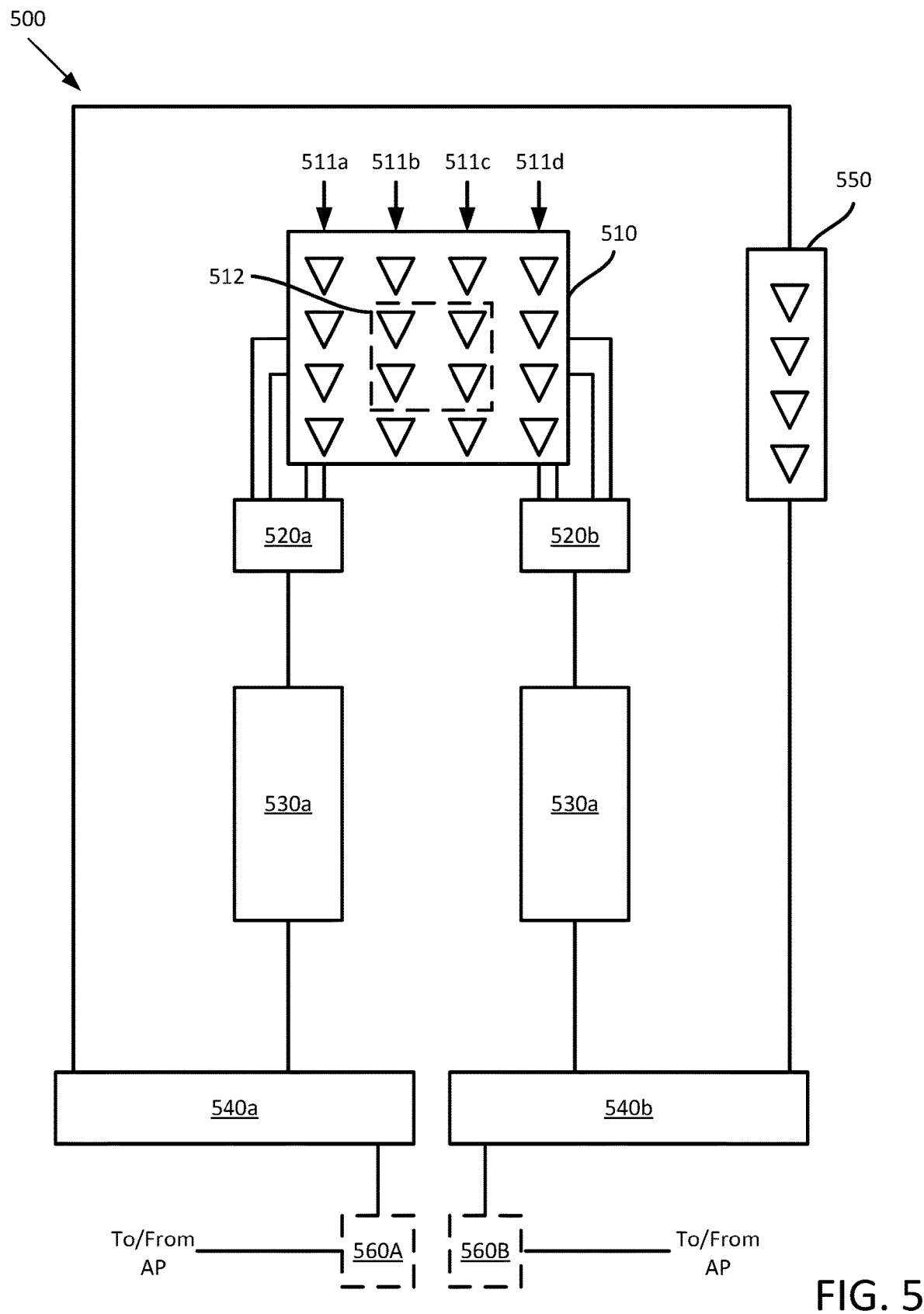
FIG. 5 illustrates a component layout for an antenna segment, according to embodiments of the present disclosure.

FIG. 5 illustrates a component layout for an antenna segment 500, according to embodiments of the present disclosure. Each antenna segment 500 is configured to operate either a narrow-beam antenna array 510 and a wide-beam antenna array 550 (at a given time. The narrow-beam antenna array 510 provides an N×N array of antenna elements, whereas the wide-beam antenna array 550 provides a 1×M array of antenna elements. The number of elements (e.g., the individual signaling elements making up the antenna arrays) in an array determines the beamwidth in azimuth and elevation. The layout of the narrow-beam patch 510 provides an (N−2)×(N−2) subset of inner antenna elements 512, which are surrounded by a subset of outer antenna elements (i.e., those antenna elements included in the narrow-beam antenna array 510 that are not neighbored by at least four antennas).

The narrow-beam antenna array 510 and the wide-beam antenna array 550 are dual polarized antenna arrays. By being dual polarized, two different radio paths can use the same array at the same time. One path is connected to a vertical polarization feed, while the other is connected to a horizontal polarization feed, essentially providing two antenna arrays with one set of elements.

Signals are routed to/from the narrow-beam antenna array 510 or the wide-beam antenna array 550 via a switching pathway. The switching pathway includes several switches 530a-b and 540a-b that route signals to/from the activated antenna array. Base switches 540a-b determine whether the signals are routed to/from the narrow-beam array 510 or the wide-beam antenna array 550, whereas intermediary switches 530a-b route the signals to/from the phase shifters 520a-b connected to the narrow-beam antenna array 510. Although illustrated with one arrangement of switching components, it will be appreciated that various other arrangements of switching components (including cascaded 2:1 switches) can be used to link the antenna arrays to various signaling sources.

The low side lobes formed through aggressively tapering the narrow beam prevent APs in the same frequencies from detecting one another's transmissions, even when mounted in close proximity to one another (e.g., within 50 feet). In some embodiments, the side lobes have an amplitude of −30 dB relative to the main lobes of the narrow beam. In various embodiments, unequal power dividers and attenuators are used to provide lower powered signals to the outer antenna elements of the narrow-beam antenna array 510 than the inner antenna elements, thereby reducing the power of the side lobes relative to a main lobe. Due to the control of the side lobe amplitude, the antenna segment 500 (and any antenna array including the antenna segment 500) can omit bandpass filters 560a-b that are typically used to increase isolation between co-located radios within an AP, although in some embodiments the bandpass filters can be retained to increase co-located radio isolation.

A pair of phase shifters 520a-b is connected to each feed of the dual-polarized narrow-beam antenna array 510, which allows for each polarization of the beam to be steered. These positions can include a neutral position, where no steering is applied, a positive offset from the neutral position in a first direction, and a negative offset from the neutral position in a second direction opposite to the first direction. In various aspects, the phase shifters 520a-b are Butler matrices, but other switched phase feed networks can be used as phase shifters 520a-b to steer the beams in discrete increments while maintaining minimal side lobes. wherein the first phase shifter 520a steers the first beam for the vertical polarization by phase shifting the first signal across columns of the narrow-beam antenna array 510 and wherein the second phase shifter 520b steers the first beam for the horizontal polarization by phase shifting the second signal across columns of the narrow-beam antenna array 510.

In various embodiments, the phase shifters 520a-b steer the narrow beam by creating relative phase differences in the columns of the narrow-beam array 510. For example, when steering to a positive offset, if the first column 511a has a phase of A, the second column 511b would have a phase of A+B where B is a fixed phase difference determined to create the desired degrees of steering, the third column 511c would have a phase of A+(2*B), and the fourth column 511d would have a phase of A+(3*B). To steer to a negative offset, if the first column 511a has a phase of A, the second column 511b would have a phase of A−B where B a fixed phase difference determined to create the desired degrees of steering, the third column 511c would have a phase of A−(2*B), and the fourth column 511d would have a phase of A−(3*B). To remain at the neutral or zero-offset position, the phases across the columns 511a-d are all equal.

The wide-beam antenna array 550 produces a fixed position beam (e.g., the beams 130a, 130b discussed in FIGS. 1A and 1B), whereas the narrow-beam antenna array 510 produces an electronically steerable beam (e.g., the beams 230a-f discussed in FIGS. 2A-2F). The narrow-beam antenna array 510 produces a beam of a first beamwidth, which is less than the beamwidth of the beam produced by the wide-beam antenna array 550. In various embodiments, the beamwidth of the beam produces by the wide-beam antenna array 550 includes or encompasses all of the coverage ranges of the beam produced by the narrow-beam antenna array 510 steered to any of the potential positions thereof.

Figure 6:
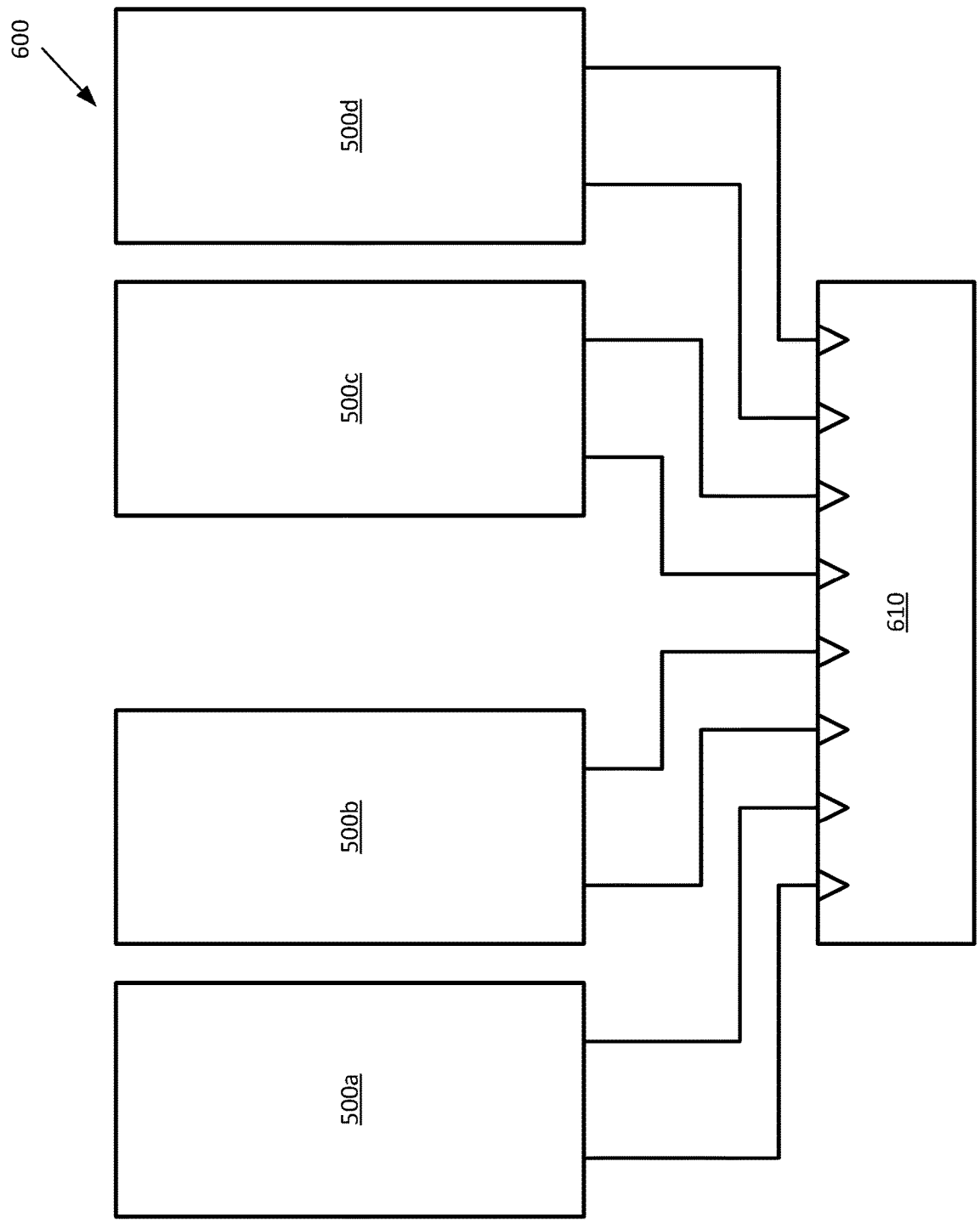
FIG. 6 illustrates a component layout for an antenna array, according to embodiments of the present disclosure.

FIG. 6 illustrates a component layout for an antenna array 600, according to embodiments of the present disclosure. The antenna array 600 includes four instances of an antenna segment 500a-d as described in relation to FIG. 5 and an interface 610 acting as a signal source for signals to transmit via the antenna segments 500a-d, and may be used as a steerable and switchable antenna array for various APs in venues in which available bandwidth is at a premium. In various embodiments, two or more radios are connected to the antenna segments 500a-d (and/or alternative antennas) via the interface 610.

In various embodiments, additional alternative antennas can also be connected (via one or more switches) to various ports of the interface 610 to allow for different frequencies, communication standards, or beam patterns to be used in the antenna array 600. For example, the antenna segments 500a-d can operate in a first frequency bandwidth (e.g., 5 GHz) from all of the radios sending signals via the ports of the interface 610 (e.g., ports ABCD and EFGH), but additional antennas (not illustrated) connected to a subset of the ports (e.g., ports EGHG) can operate in a second frequency bandwidth (e.g., 2.4 GHz).

Using four instances of the antenna array 600, an AP is configured to operate in a dual 4×4 MIMO mode with no mutual interference between radios. Accordingly, due to the beam shaping and tapering provided by the individual antenna segments 500a-d (e.g., precise antenna pattern with low side lobe levels), the antenna array 600 allows for high-channel reuse in high-density applications where several APs are deployed with corresponding instances of the antenna array 600. Switchable beam directions allow flexibility in aligning cells in the same or adjoining coverage areas for the different APs so that several APs can be grouped closely together (e.g., within 50 feet of one another).

Figure 7:
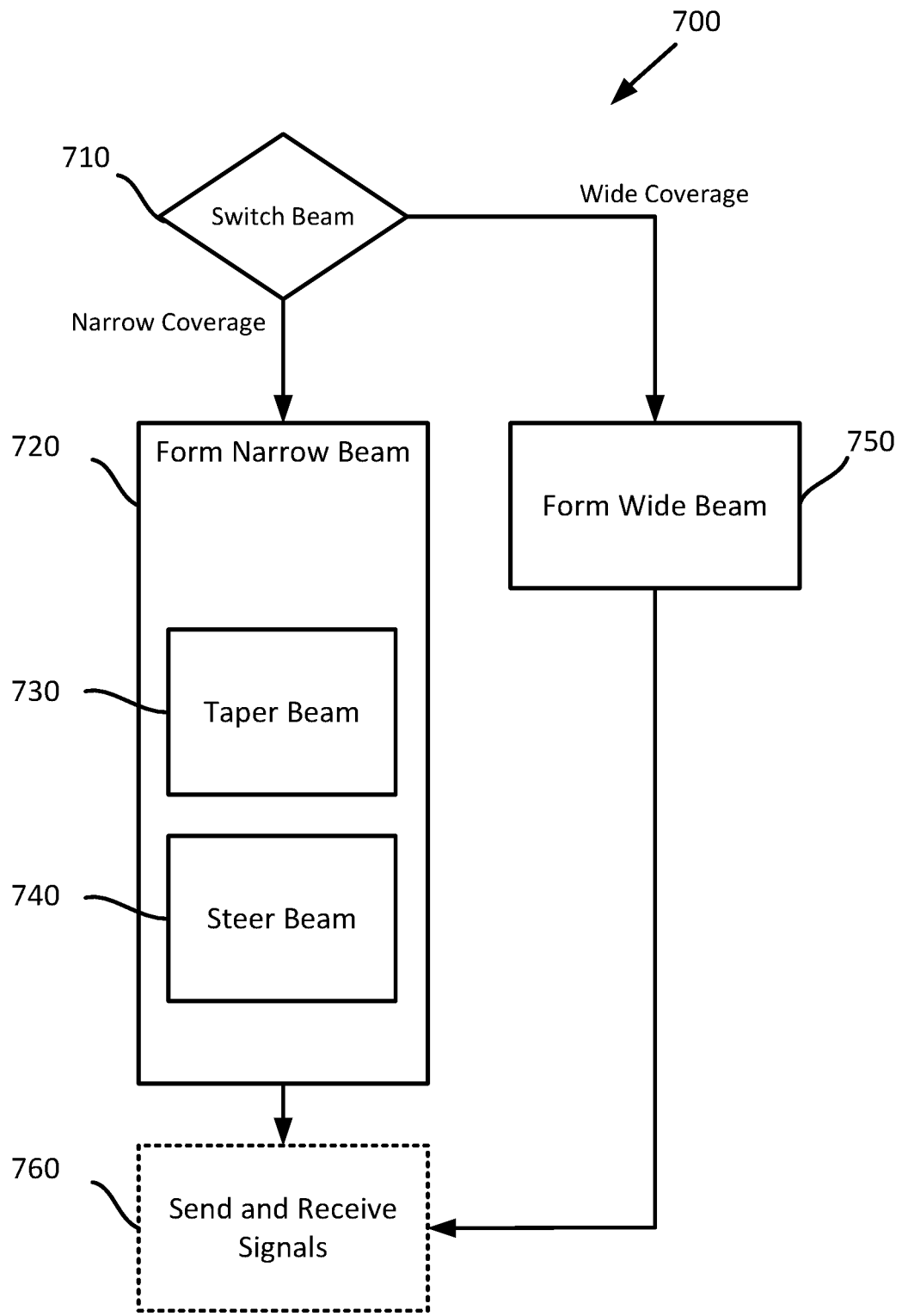
FIG. 7 is a flowchart of a method for managing an electrically steerable antenna array, according to embodiments of the present disclosure.

FIG. 7 is a flowchart of a method 700 for managing an electrically steerable antenna array, according to embodiments of the present disclosure. Method 700 can be performed independently by each antenna set in the antenna array so that each beam is independently switched to/from a narrow or wide setting and is independently steered to various positions when in the narrow setting. As will be appreciated, elements of method 700 are performed intrinsically by using the antenna array disclosed herein, and one or more blocks may be performed substantially in parallel or at the same time as other blocks of method 700, and method 700 may periodically cycle or repeat as the antenna array is controlled to update how the coverage ranges are generated.

At block 710, the antenna array switches operational modes between one of a wide coverage mode or a narrow coverage mode. An AP connected to the antenna array can signal which operational mode to switch to based off of the coverage needs of the various stations in communication with the AP, signal propagation characteristics of the environment, and the number of stations attempting to communicate with the AP, among other factors. When the antenna array switches to the narrow coverage mode, the method 700 proceeds to block 720. When the antenna array switches to the wide coverage mode, the method 700 proceeds to block 760.

At block 720, the antenna array forms a narrow beam with a narrow coverage range by activating a narrow beam array. The narrow beam array can send and receive signals via various polarizations to reuse the available hardware and available spectrum. When forming a narrow beam, the antenna array tapers the amplitude of the narrow beam (per block 730) by supplying lower power to the external elements of the narrow beam array than to the internal elements of the narrow beam array, and determines where to steer the narrow beam. In various embodiments, the difference in power supplied to the internal and external elements of the narrow beam array produces a beam with side lobes with a power level −30 dB relative to the power level a main beam, which allows for several APs using instances of the antenna array to be placed close to one another (e.g., within 50 feet of one another) and use the same channel without interfering with one another or causing cross-talk between the APs.

At block 740, the antenna array steers the narrow beam to a desired offset. In various embodiments, the antenna array can steer the narrow beam to one of three positions by one of: leaving the narrow beam in a neutral position, applying a positive phase shift to the signals across the columns of the narrow beam array to steer the narrow beam to a positive offset, or apply a negative phase shift to the signals across the columns of the narrow beam array to steer the narrow beam to a negative offset.

When two narrow beam arrays are both in the narrow mode, the antenna array can provide several different coverage patterns, such as those illustrated in FIGS. 2A-2F. For example, when a first coverage range is steered to a first positive offset and a second coverage range is steered to a second negative offset, the antenna array produces a boresight pattern, where each of the coverage ranges overlap to a greatest extent possible given the steering options. In contrast, when a first coverage range is steered to a first negative offset and a second coverage range is steered to a second positive offset, the antenna array produces an expanded linear pattern with a greatest spatial isolation between the two coverage ranges given the steering options. The antenna array can produce other coverage patterns with intermediary levels of overlap/spatial isolation according to the wireless communications needs of the stations served by the associated AP.

At block 750, the antenna array forms a wide beam with a wide coverage range by activating a wide beam array. The wide beam array is neither tapered nor steered, and provides a wide coverage range that encompasses ranges of the narrow beams at each of the steered positions.

Once the beam (narrow or wide) is formed, method 700 proceeds to block 760, where the antenna array sends and receives signals according via the formed beam in the corresponding coverage range. Method 700 may then conclude or restart at block 710 when the beam is reformed (e.g., switched from narrow to wide, switched from wide to narrow, steered to a different offset, etc.).

Figure 8:
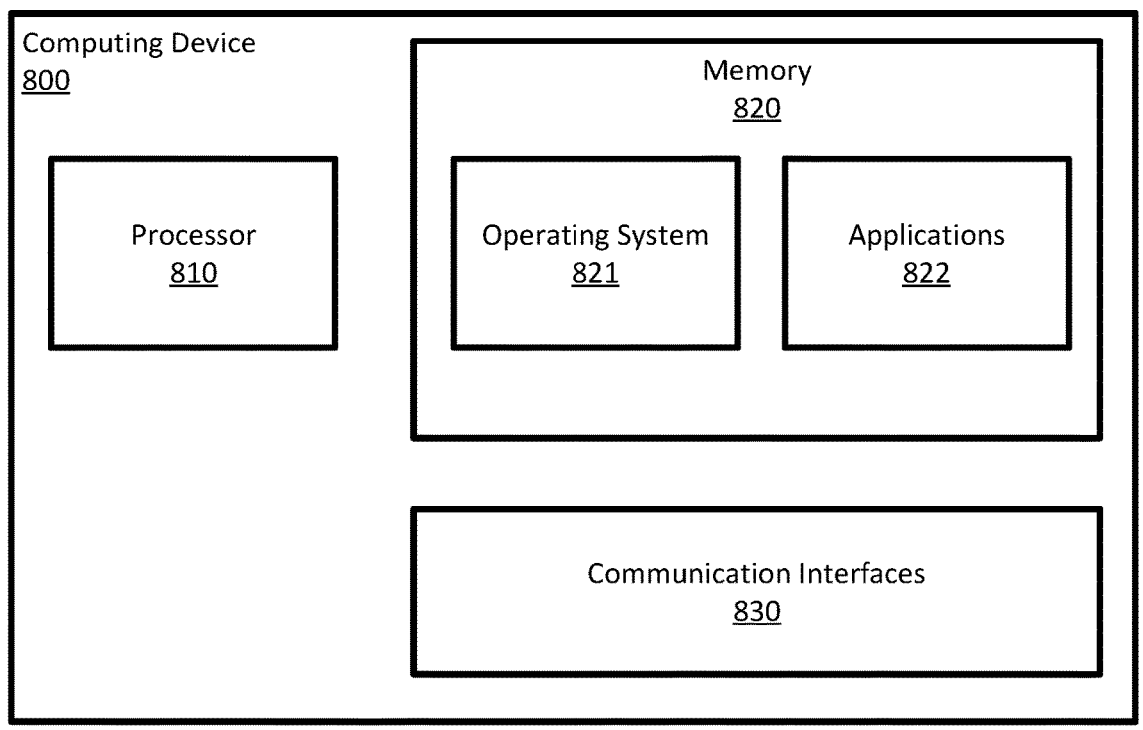
FIG. 8 illustrates hardware of a computing device, as may be used in an AP described in the present disclosure.

FIG. 8 illustrates hardware of a computing device 800, as may be used in an AP 150 described in the present disclosure. The computing device 800 includes a processor 810, a memory 820, and communication interfaces 830. The processor 810 may be any processing element capable of performing the functions described herein. The processor 810 represents a single processor, multiple processors, a processor with multiple cores, and combinations thereof. The communication interfaces 830 facilitate communications between the computing device 800 and other devices, such as the interface 630. The memory 820 may be either volatile or non-volatile memory and may include RAM, flash, cache, disk drives, and other computer readable memory storage devices. Although shown as a single entity, the memory 820 may be divided into different memory storage elements such as RAM and one or more hard disk drives.

As shown, the memory 820 includes various instructions that are executable by the processor 810 to provide an operating system 821 to manage various functions of the computing device 800 and one or more applications 822 to provide various functionalities to users of the computing device 800, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A device, comprising:
  a plurality of antenna segments that each include:
    a narrow-beam antenna array, configured to produce a first beam of a first beamwidth;
    a wide-beam antenna array, configured to produce a second beam of a second beamwidth greater than the first beamwidth of the first beam;
    a switching pathway, configured to selectively activate one of the narrow-beam antenna array or the wide-beam antenna array at a given time;
    a first phase shifter and a second phase shifter connected between the switching pathway and the narrow-beam antenna array, configured to steer the first beam in an azimuthal plane from a first position to a second position;
    wherein when a given first beam of a given antenna segment of the plurality of antenna segments is steered to the first position and a different first beam of a different antenna segment of the plurality of antenna segments is steered to the first position, respective coverage ranges of the given first beam and the different first beam overlap; and
    wherein when the given first beam is steered to the second position and the different first beam is steered to the second position, the respective coverage ranges of the given first beam and the different first beam are spatially isolated from one another.

2. The device of claim 1, wherein amplitude tapering is applied to the narrow-beam antenna array so that outer antenna elements of the narrow-beam antenna array receive less power than inner antenna elements of the narrow-beam antenna array, thereby diminishing relative power of side lobes of the to a main lobe of the first beam.

3. The device of claim 1, further comprising a bandpass filter included between a radio path and the switching pathway.

4. The device of claim 1, wherein a radio path is connected directly to the switching pathway.

5. The device of claim 1, wherein the given first beam is further steerable to a third position intermediate to the first and second positions, wherein the third position is a neutral position where no steering is applied by the first phase shifter and the second phase shifter.

6. The device of claim 5, wherein:
  when the given first beam is steered to the first position and the different first beam is steered to the second position, the respective coverage ranges of the given first beam and the different first beam are spatially isolated from one another with less isolation than when the given first beam and the different first beam are both steered to the second position; and
  when the given first beam is steered to the first position and the different first beam is steered to the third position, the respective coverage ranges of the given first beam and the different first beam overlap one another with less extent than when the given first beam and the different first beam are both steered to the first position.

7. The device of claim 5, wherein when the given first beam and the different first beam are steered to the third position, the respective coverage ranges of the given first beam and the different first beam are spatially isolated from one another with less isolation than when the given first beam and the different first beam are both steered to the second position.

8. The device of claim 5, wherein when the given first beam and the different first beam are steered to the third position, the respective coverage ranges of the given first beam and the different first beam are spatially overlapping with portions of one another with less overlap than when the given first beam and the different first beam are both steered to the first position.

9. The device of claim 1, wherein a coverage range of the wide-beam antenna array includes respective coverage ranges of the first beam in the first position and in the second position.

10. The device of claim 1, wherein the narrow-beam antenna array and the wide-beam antenna array are dual polarized.

11. The device of claim 10, wherein the first phase shifter steers the first beam for a vertically polarized signal by phase shifting the first signal across columns of the narrow-beam antenna array and wherein the second phase shifter steers the first beam for a horizontally polarized signal by phase shifting the second signal across columns of the narrow-beam antenna array.

12. A system, comprising:
a steerable and switchable antenna array configured to produce a first beam with a first coverage range and a second beam with a second coverage range;
a processor; and
a memory storing instructions that, when executed by the processor, enable the steerable and switchable antenna array to:
select one of a first beamwidth and a second beamwidth for both the first beam and the second beam;
in response to selecting the first beamwidth:
switch signal inputs to narrow-beam antenna arrays included in the steerable and switchable antenna array;
steer the first beam to one of a first positive offset, a first negative offset, and a first neutral position;
steer the second beam to one of a second positive offset, a second negative offset, and a second neutral position; and
transmit signals received from the signal inputs via the first beam and the second beam; and
in response to selecting the second beamwidth:
switch signal inputs to wide-beam antenna arrays included in the steerable and switchable antenna array; and
transmit signals received from the signal inputs via the first beam and the second beam.

13. The system of claim 12, wherein the instructions, when executed by the processor, further enable the steerable and switchable antenna array to:
shape the first beam and the second beam to have side lobes with an amplitude of −30 dB relative to main lobes of the first beam and the second beam.

14. The system of claim 13, wherein a channel selected for the first beam is re-used by a second AP within 50 feet of the steerable and switchable antenna array.

15. The system of claim 12, wherein the first beam and the second beam are steered via phase shifting the signals across columns of antennas of the narrow-beam antenna arrays.

16. The system of claim 12, wherein the system operates in a 4×4 MIMO array.

17. The system of claim 12, wherein the first beam and the second beam are steered via Butler matrices.

18. A method, comprising:
forming, by a first antenna segment, a first beam with a first coverage range, wherein forming the first beam includes:
tapering a first amplitude of the first beam by supplying lower power to external elements of a first antenna array than to internal elements of the first antenna array; and
steering the first beam from a first neutral position to one of a first positive offset and a first negative offset by phase shifting signals for transmission according to the first beam across columns of the first antenna array;
forming, by a second antenna segment, a second beam with a second coverage range, wherein forming the second beam includes:
tapering a second amplitude of the second beam by supplying lower power to external elements of a second antenna array than to internal elements of the second antenna array; and
steering the second beam from a second neutral position to one of a second positive offset and a second negative offset by phase shifting signals for transmission according to the second beam across columns of the second antenna array;
wherein the first coverage range and the second coverage range form a boresight pattern when the first beam is steered to the first positive offset and the second beam is steered to the second negative offset; and
wherein the first coverage range and the second coverage range form an expanded linear pattern with spatial isolation between the first coverage range and the second coverage range when the first beam is steered to the first negative offset and the second beam is steered to the second positive offset.

19. The method of claim 18, wherein beam forming and amplitude tapering produces a beam with side lobes with −30 dB relative to a main beam, wherein a channel selected for the first beam is re-used by a second AP within 50 feet of the first antenna segment.

20. The method of claim 18, further comprising:
switching, in the first antenna segment, from the first antenna array to a second antenna array to produce a third beam with a wider beamwidth than the first beam, wherein a coverage range of the third beam encompasses coverage ranges of the first beam in each of the first positive offset, the first neutral position, and the first negative offset; and
switching, in the second antenna segment, from the second antenna array to a fourth antenna array to produce a fourth beam with a wider beamwidth than the second beam, wherein a coverage range of the fourth beam encompasses coverage ranges of the second beam in each of the second positive offset, the second neutral position, and the second negative offset.

* * * * *